Dec. 9, 1952  A. D. FORBUSH  2,620,852

TIRE REPAIR METHOD

Filed Oct. 14, 1950

Inventor
AUGUSTUS D. FORBUSH
By
Attorney

Patented Dec. 9, 1952

2,620,852

UNITED STATES PATENT OFFICE 2,620,852

TIRE REPAIR METHOD

Augustus D. Forbush, Pueblo, Colo.

Application October 14, 1950, Serial No. 190,224

1 Claim. (Cl. 154—14)

This invention relates to the rehabilitation and repair of pneumatic tire casings, and more particularly to the rehabilitation and repair of large-size, heavy-duty tire casings such as are commonly employed on tractors, earth-working equipment, and the like, and has as an object to provide an improved method applicable primarily to the repair of breaks, cuts and ruptures manifest in the carcass or body of such casings.

A further object of the invention is to provide a novel and improved method for the rehabilitation and repair of damaged tire casing carcasses productive of enhanced permanence and security of the repair.

A further object of the invention is to provide a novel and improved tire casing repair method step employable in and as a supplement to conventional tire casing repair techniques with enhanced permanence and security of result.

A further object of the invention is to provide a novel and improved method of tire casing repair that is simple and easy of practice through the use of commonly-available tools and equipment, that is positive in the attainment of advantage over conventional methods, and that is of economic consequence as a means of salvaging expensive equipment not amenable to satisfactory rehabilitation through usual techniques.

With the foregoing and other objects in view, my invention consists in the nature and sequential relation of tire casing repair steps as hereinafter set forth, pointed out in my claim, and exemplified by the accompanying drawing, in which—

Figure 2:
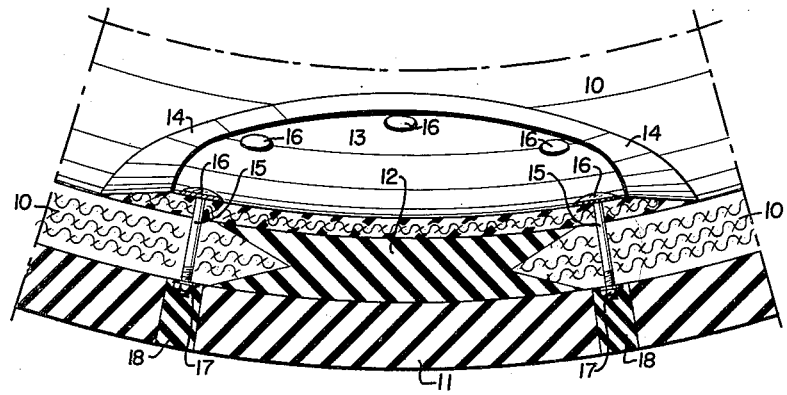
Figure 1:
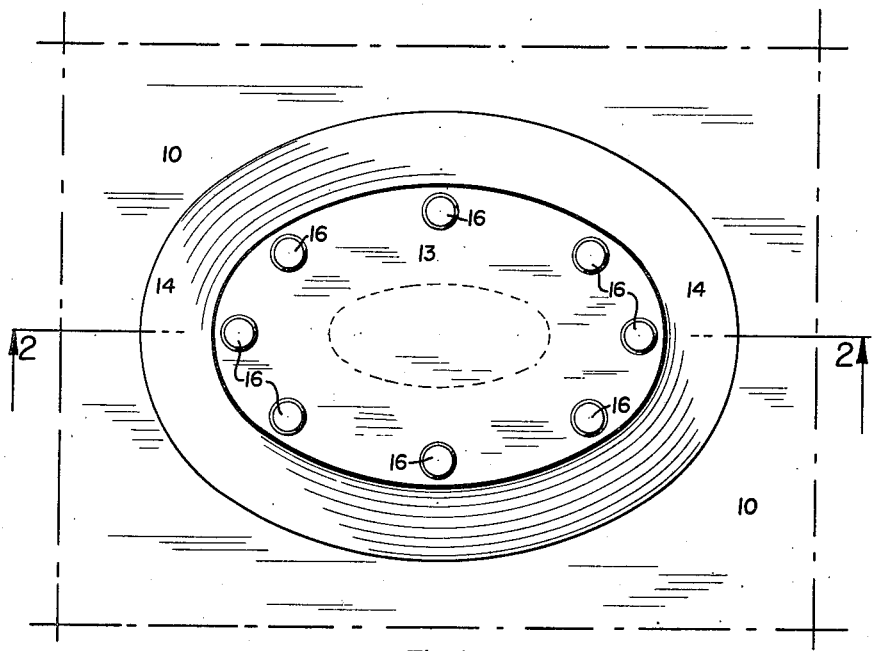

Figure 1 is a fragmentary, detail view of a tire casing inner wall portion as repaired in accordance with the principles of my invention. Figure 2 is a fragmentary, detail section taken substantially on the indicated line 2—2 of Figure 1.

Pneumatic tire casings of large size and important value are commonly employed on various types and kinds of industrial and commercial wheeled equipment where they are subject to loads, stresses, and hazards conducive to damage in the form of carcass breaks, ruptures, tears and cuts. As is well known, the tire casing carcass is constituted from interbonded layers of fabric or cord to provide the requisite tire strength and hence any interruption of the carcass continuity is a weakness impairing the utility of the casing and inviting its premature discard. Application of hitherto known methods to the repair of carcass damage in such tires has been of indifferent success due to reliance upon an adherent bond, such as gum, cement, vulcanized rubber, or the like, as the means for retaining replacement and filler material in place and for securing a reinforcement across the damaged area, the strength and dependability of the adherent bond determining the security and permanence of the repair. It is common experience that adherent bonds applied to tire casing repair are prone to loosen under the heats, frictions, and flexures incident to tire operation, margins of an adherently-bonded reinforcing patch gradually working and creeping relative to the associated tire carcass until the utility of the reinforcement is nullified, and this inadequacy of conventional repairs is most vexatious as manifest in tires of high cost subject to extremes in operating conditions, hence the instant invention is directed to an improved repair method and technique applicable to largely obviate the inadequacies of usual tire repair practices.

Very simply, the improved method of the invention supplements and extends conventional tire casing repair methods which employ an adherently-bonded reinforcing patch interiorly of the casing by positively clamping and inseparably attaching points of the reinforcing patch spaced about the damaged carcass area to the tire carcass in a manner to maintain the patch in reinforcing relation with the damaged area and against relative working or creeping due to or resulting in failure of its adherent bond to the carcass. While the practicality and availability of certain forms of attaching means favors their use in the practice of the improved method, it is to be understood that the invention is not correspondingly limited but contemplates and embraces the use of any and all agencies effective to accomplish the positive clamping and inseparable attachment of reinforcing patch points to and about the damaged area of a tire carcass in the relationship and for the purposes hereinafter elaborated.

In the drawing, the numeral 10 designates the typical fabric or cord carcass of a heavy-duty tire casing and the numeral 11 designates the tire casing tread portion bonded to and exteriorly about the carcass. Customarily, the carcass 10 is a relatively stiff body of interbonded laminations molded as a hollow torus whereof the walls are expansively separable relative to a plane perpendicular to the axis of revolution and intersecting the axis-adjacent side of the body, and the tread portion is molded as a more resilient and pliable layer to and exteriorly about the carcass to cover the latter with a protective shield graduated in thickness from a major depth overlying the major or outer circumference of the body, thus exposing the concave carcass inner face as the casing inner surface against which the inflatable tube engages. As so constructed, conventional tire casings derive their strength from the carcass, and while damage to the tread portion not affecting the carcass may be of little consequence and readily repaired, damage to the carcass seriously impairs the utility of the casing. Further, the limited pliability of the carcass relative to the tread portion may give rise to breaks in and separations of the constituent laminations without any effect upon the tread portion, any and all such impairments of the carcass requiring remedial attention if the utility of the casing is to be preserved.

In the illustrated exemplification, the method has been applied to the repair of a rupture opening entirely through the carcass 10 and, probably, initially through the tread 11 as well, such rupture being indicated by the broken line oval of Figure 1 and the discontinuity of the carcass representation in Figure 2, but it is to be understood that the principles of the illustrated method are equally and similarly applicable to the repair of all types and degrees of carcass damage, whether or not fully intersecting the carcass.

Conventional repair techniques are initially applied to the damaged carcass; broken edges of the carcass may be trimmed and skived, as illustrated, or the edges marking the failure may be left jagged and rough. In either event, the break in the carcass is filled in with initially plastic rubber, rubber gum, or rubber cement, as represented at 12, any damage to the tread portion 11 is correspondingly treated, and a conventional reinforcing patch 13, of interbonded fabric or cord laminations in an appropriate size and weight, is adhered to the carcass interior face in covering relation with the damaged area, the resulting assembly usually being heat-treated to set and vulcanize the repair by conventional methods and leaving the patch 13, which is usually skived and beveled to a thin outer margin, as at 14, secured, positioned, and retained in place only by its bond with and against the carcass inner face.

Giving effect to the principles of the invention, the repair as above effected is extended and supplemented by the insertion of a plurality of rigid, metallic fasteners, illustrated as bolts 15, through appropriately-formed holes spaced apart about the damaged carcass area and intersecting the patch 13 and carcass 10 portions adjacent the patch periphery, and suitable flat heads 16 on the inner ends of the bolts 15 engage the exposed surface of said patch and clamp thereagainst to draw the patch into securely-clamped relation with the underlying carcass as nuts 17 are run up on the outer threaded ends of said bolts within bores formed for their accommodation in and through the tread portion 11. The nuts 17 having been tightened and set with the patch 13 securely clamped to the carcass 10, the nut-accommodating bores opening outwardly through the tread portion 11 are appropriately plugged or filled, as at 18, in a conventional manner to complete the repair and condition the rehabilitated casing for use. While it is desirable in certain instances that the nut-accommodating bores extend entirely through the tread portion 11 and to the carcass 10 surface normally bonded to the tread portion, thereby to dispose the nuts 17 in bearing relation against the relatively firmer, less compressible carcass body, adequate anchorage of the patch 13 margin may result in many cases when the nuts 17 are but slightly recessed within the tread portion to bear against tread portion material rather than directly against the carcass, and while it is manifestly desirable and expedient that the bores or recesses accommodating the said nuts 17 be closed into smooth conformity with the tread surface, as illustrated and described, it is to be understood that when the nuts are tightened upon their respective bolts 15 to compress the material traversed by the bolts, particularly when a washer is employed under each nut, such compression operates to close the bolt holes against the penetration therethrough of fluids and extraneous materials which might damage the tire interior.

While the headed bolts 15 in threaded cooperation with the nuts 17 are illustrated and described as fasteners appropriate to give effect to the principles and practice of the improved method, other forms, types, and constructions of functionally equivalent fasteners, such as pins, rivets, binding posts, and the like, may be employed in substitution for the devices shown without in any way altering the principle or depreciating the effectiveness of the improved method. Marginally secured to the carcass interior by any suitable fastening means in the manner shown and described, the patch 13 is securely and permanently held as positioned interiorly of the casing to cover over the carcass repair and to reinforce the damage-weakened carcass area. any tendency of the patch to loosen or shift relative to the casing as a consequence of adhesive bond failure being effectively resisted by the patch-clamping fastenings and any stresses tending to reestablish or enlarge the carcass damage repaired by said patch being applied through said fastenings to the patch reinforcement, irrespective of the strength and tenacity of the adhesive bond between the patch and carcass.

As is manifest, heat treatment of a tire repair to set or vulcanize the bonding, repair, and replacement material employed may be accomplished either before or after the fasteners have been applied to clamp the patch to the carcass, the degree of heat utilized in such treatment being normally much less than will adversely affect metallic fastening elements and the type and disposition of the positioned fasteners being susceptible of selection and arrangement for accommodation within conventional heat treating forms and molds.

Since changes, variations, and modifications in the form, style, and construction of fasteners appropriate for use in the improved method, and in the particular relationship and sequence of method steps, may be had without departing from the spirit of the invention, I wish to be understood as being limited solely by the scope of the appended claim, rather than by any details of the illustrative showing and foregoing description.

I claim as my invention:

The method of repairing carcass damage in pneumatic tire casings consisting in skiving the area of the tire immediately surrounding the injury, cementing a suitable patch to the inner wall of the tire completely covering and surrounding the injured portion of said tire, said patch being of sufficient thickness and strength to resist all normal internal and external pressures, drilling a series of spaced aligning holes through both tire and patch disposed closely adjacent to and generally following the margins of the injury in said tire to substantially surround said injury at points adjacent thereto, introducing headed and threaded bolts through the aligning holes of said tire and patch, applying nuts to the threaded ends of said bolts to create a tight bond between the patch and tire and prevent displacement of said patch, filling the skived area of the tire with rubber, and finally curing the same.

AUGUSTUS D. FORBUSH.

REFERENCES CITED

The following references are of record in the file of this patent:

UNITED STATES PATENTS

| Number | Name | Date |
|---|---|---|
| 1,279,301 | Dull | Sept. 17, 1918 |
| 1,374,846 | Goodlake | Apr. 12, 1921 |
| 1,624,619 | Moore | Apr. 12, 1927 |
| 1,938,816 | Eger | Dec. 12, 1933 |
| 2,130,658 | Watson | Sept. 20, 1938 |
| 2,140,672 | Gray et al. | Dec. 20, 1938 |
| 2,229,878 | Wilson | Jan. 28, 1941 |
| 2,480,631 | Cage | Aug. 30, 1949 |
| 2,483,010 | Hooper | Sept. 27, 1949 |

FOREIGN PATENTS

| Number | Country | Date |
|---|---|---|
| 456,476 | France | June 19, 1913 |